Oct. 25, 1932.   G. F. WALTER   1,884,935
SOLDERING APPARATUS
Filed Aug. 27, 1930    2 Sheets-Sheet 1

INVENTOR
George Fredrick Walter
BY
John C. Carpenter
ATTORNEY

Oct. 25, 1932.    G. F. WALTER    1,884,935
SOLDERING APPARATUS
Filed Aug. 27, 1930    2 Sheets-Sheet 2

INVENTOR
George Fredrick Walter
BY
John C. Carpenter
ATTORNEY

Patented Oct. 25, 1932

1,884,935

UNITED STATES PATENT OFFICE

GEORGE FREDRICK WALTER, OF BROOKLYN, NEW YORK, ASSIGNOR TO AMERICAN CAN COMPANY, OF NEW YORK, N. Y., A CORPORATION OF NEW JERSEY

SOLDERING APPARATUS

Application filed August 27, 1930. Serial No. 478,086.

The present invention relates to a soldering apparatus and has particular reference to an improved type of solder wiping device for such an apparatus.

The principal object of the present invention is the provision of a wiping device for a soldering apparatus which engages the freshly soldered surface of an article and removes excess solder therefrom by wiping it into the soldered seam.

An important object of the invention is the provision of an improved wiping device for wiping solder from the side seam of a soldered can body and for the removal of the solder from the wiping element.

An important object of the present invention is the provision of a solder wiping device for use in a soldering apparatus which utilizes an improved manner of handling the excess solder removed in the solder wiping operation by using different rates of speed in different operations connected with solder wiping.

A further important object of the invention is the provision of a wiping device for a soldering apparatus wherein the wiping element is rotated at right angles to the rotation of a solder wiper removing element.

An important object of the invention is the provision of an improved wiper which continually presents a clean surface, free from solder, to the soldered surface of a can body being soldered in the apparatus.

Numerous other objects of the invention will be apparent as it is better understood from the following description, which, taken in connection with the accompanying drawings, discloses a preferred embodiment thereof.

Referring to the drawings.

Figure 1:
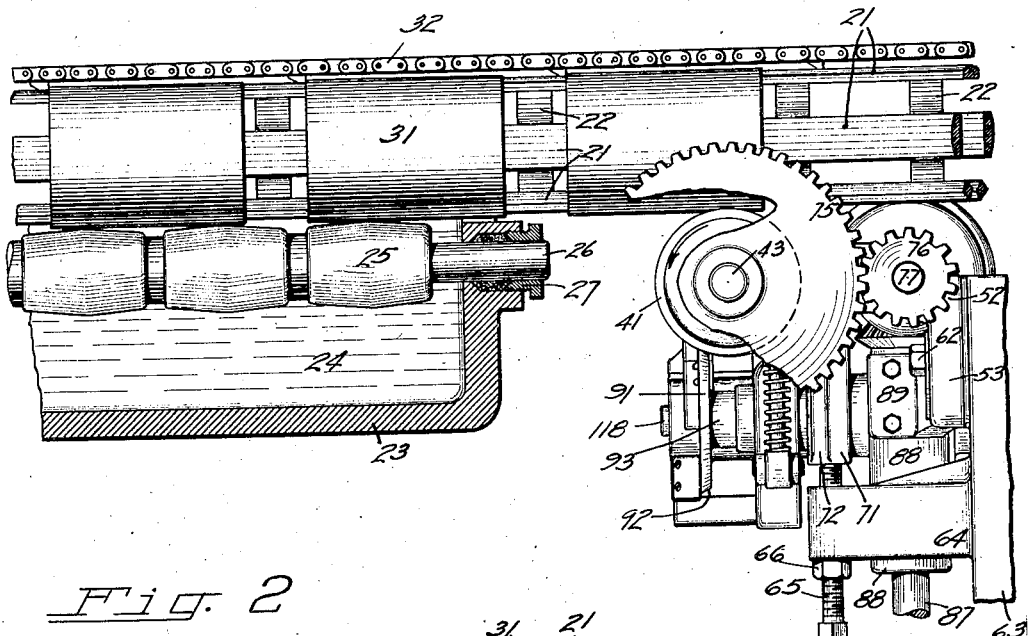
Figure 1 is a fragmentary partial elevation, partial section of a solder applying apparatus and an improved type of wiping device embodying the present invention.

The mechanism disclosed in the drawings for exemplifying the present invention, comprises a solder horn or mandrel formed with longitudinal bar sections 21 and transverse spacer sections 22. This horn is located in a horizontal plane and extends over a solder bath 23 adapted to hold molten solder 24. The solder applying devices may comprise a solder roller 25 mounted on a horizontal shaft 26 which extends through end walls of the solder bath. A stuffing box 27 is preferably used where the shaft 26 extends through the wall of the bath. This solder applying roller 25 may be rotated in the usual and preferred manner, the roller being partly submerged in the molten solder 24 contained within the bath.

Figure 2:
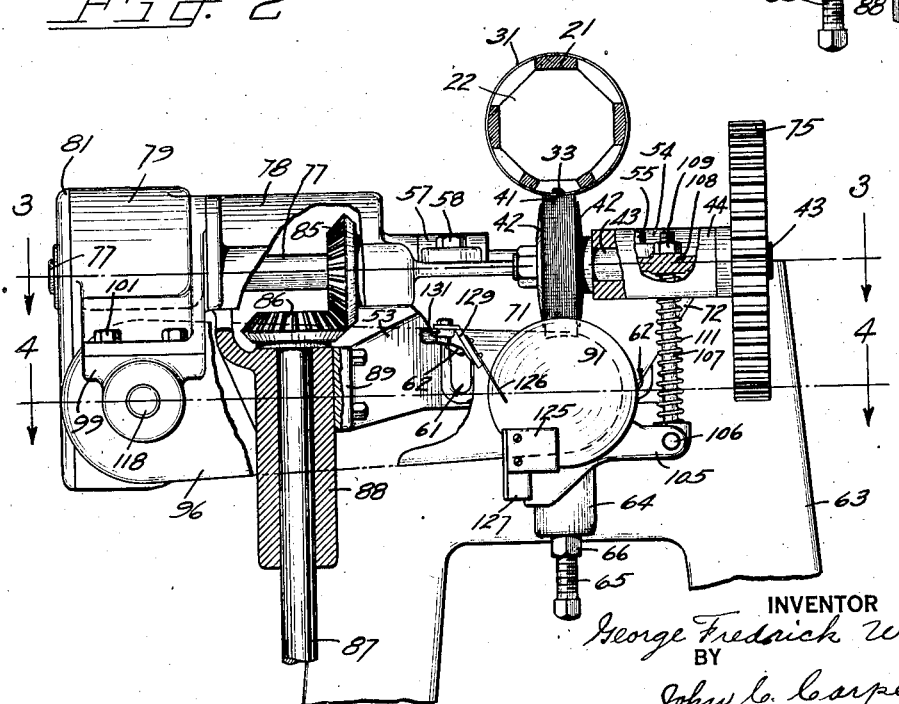
Fig. 2 is an end elevation of the wiping device.

The article to be soldered may be a can body 31 which may be moved longitudinally of the solder horn by a conveyor chain 32 mounted in the usual and preferred manner. During the passage of the can body 31 along the solder horn, a side seam 33 thereof (Fig. 2), engages the rotating solder applying roller 25 and receives a quantity of molten solder therefrom, following which it is brought into the zone of action of the solder wiping device.

This device comprises a solder wiping roller 41 preferably composed of laminated fabric discs held in compact form by side plates 42, the roller and the plates being mounted on a horizontal wiper shaft 43 journaled in a bearing 44 formed in a frame 45. The frame 45 is pivotally connected to a stationary part of the apparatus, the frame having extensions which provide bearings 46, 47 and 48 for pivotal engagement with sleeves 49 and 51. The sleeve 49 extends into and between the bearings 46 and 47, while the sleeve 51 forms a support for the bearings 48.

Figure 4:
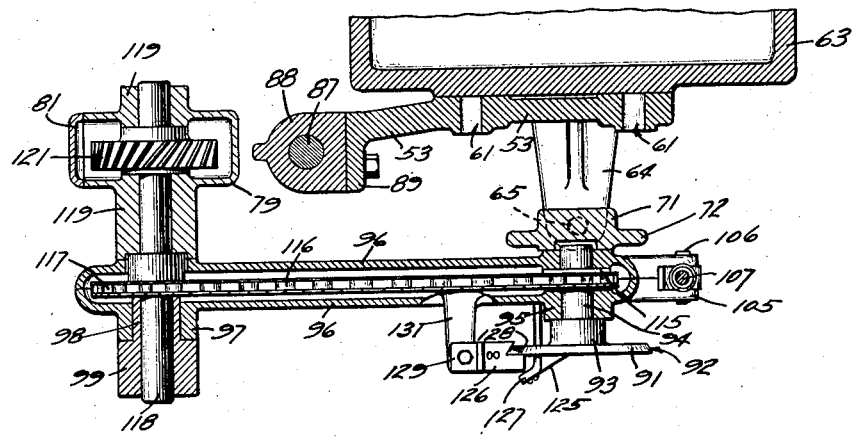
Fig. 4 is a fragmentary sectional view taken substantially along the line 4—4 in Fig. 2.

The sleeve 49 is clamped between an extension 52 of a bracket 53 and a bearing cap 54 held thereon by bolts 55. In a similar manner, the sleeve 51 is clamped between an extension 56 projecting outwardly from the bracket 53 and a bearing cap 57 held thereon in clamped position by bolts 58. The bracket 53 is provided with vertical slots 61 (Figs. 2 and 4) through which extend bolts 62 (Fig. 1) which hold the bracket in adjusted position on the vertical wall of a frame 63. Frame 63 may be a stationary part of the soldering apparatus.

The frame 45 carrying its roller 41 and shaft 43 is adapted to normally rest in an adjusted position relative to the stationary part 63 and for this purpose a bracket 64 (Figs. 1 and 4) projects outwardly from the face of the frame 63 and carries a vertically extending set screw 65 threadedly engaging within the bracket 64 and held in adjusted position by a locknut 66.

The frame 45 projects downwardly in a foot section 71 reinforced by a web 72, which rests upon the upper end of the setscrew 65. This construction permits raising and lowering of the outer part of the frame which carries the shaft 43 by pivoting of the same on its supporting sleeves 49 and 51. After it is properly positioned the weight of the frame and its parts holds the same in position on the screw 65.

Figure 3:
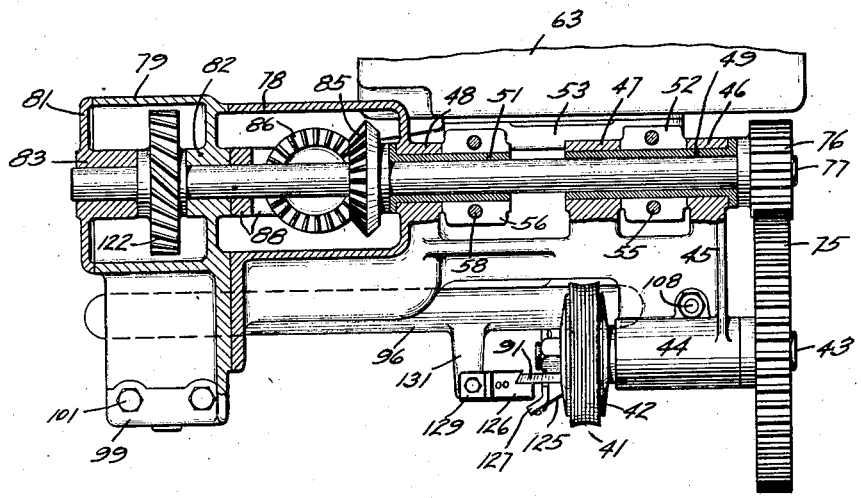
Fig. 3 is a plan sectional view taken substantially along the line 3—3 in Fig. 2.

The wiper roller 41 is adapted to be rotated with its shaft 43, the latter carrying a gear 75 for this purpose. The gear 75 is engaged by a pinion 76 secured to one end of a horizontal shaft 77 which extends through the sleeves 49 and 51 and which rotates therein. The frame 45 beyond the bearing 48 is formed as a gear casing 78 to the outer end of which is secured an auxiliary casing 79 (Figs. 2 and 3) closed by a cover plate 81. The casing 79 provides a further bearing 82 for the shaft 77 and in similar manner the cover plate 81 provides a bearing 83 therefor.

The shaft 77 also carries a bevel gear 85 which meshes with a similar gear 86 secured to the upper end of a vertical shaft 87 journaled in a sleeve bearing 88 bolted at 89 to the bracket 53. The shaft 87 constitutes a drive shaft which may extend from and in turn be actuated by other driving mechanism. Rotation of the shaft 87, through the gears 86 and 85, shaft 77, gears 76 and 75 and shaft 43 is thus imparted to the wiper roller 41. It has been found by extensive experiments that speed of rotation of the wiping roller affects the wiping operation. A satisfactory speed of rotation of the shaft 43 and the wiping roller 41 has been determined at about 120 R. P. M. which is not rapid enough to throw solder from the roller.

Provision is made for removing the solder from the wiper roller as it collects thereon from the can body seam. This comprises a rotary scraping device operating below and at one side of the center of the shaft 43 (Fig. 1). This scraping device comprises a flat disc 91 having an outer tapered periphery 92 and being formed with a hub 93. The peripheral face 92 is of the proper angle to fully contact the periphery of the wiping roller 41.

The outer face of the disc 91 is in a vertical plane spaced a slight distance in advance of a plane passing through the center of the shaft 43, this relative position of parts being found more desirable for removing the solder from the wiping roller 41. The disc 91 rotates at a relatively high speed of travel, its hub 93 being secured to a shaft 94 rotating in bearings 95 carried on one end of an elongated housing 96 having a supporting hub 97 formed at its opposite end.

The hub 97 engages a reduced end 98 of a bracket 99 secured by bolts 101 to the housings 79. This construction permits movement of the housing 96 on its support 98 and allows for a slight up and down movement of the shaft 94 and scraping disc 91 carried in the free end of the housing. This movable mounting feature of the housing 96 permits vertical adjustment of the scraping disc relative to the wiping roller 41 and as the latter becomes smaller in diameter by reason of the wearing of the fabric material composing its wiping elements, the scraping disc may be raised to keep it in proper engagement with the wiping roller.

The housing 96 is extended at its free end in a lug section 105 (Figs. 2 and 4) and carries a pin 106 on which is pivotally mounted an eye-bolt 107 projecting upwardly and extending through a web 108 formed in the frame 45. A locknut 109 is threadedly secured to the bolt 107 at its upper end and engages the upper face of the lug 108.

A spring 111 surrounds the bolt 107 and is interposed between a lower head thereof and the frame 45 and normally holds the scraping disc 91 at a given distance from the roller 41 which distance is determined by the adjusted position of the nut 109 on the bolt 107. As the diameter of the wiping roller 41 wears down the scraping disc 91 is brought sufficiently closer for proper engagement with its periphery by adjustment of the nut 109.

Scraping disc 91 is continually rotated at a relatively high speed, a chain and sprocket drive being used for this purpose. The shaft 94 carries a sprocket 115 over which operates a chain 116 passing over a sprocket 117 mounted on a stub shaft 118 journaled in the bracket 99 at one end and in bearings 119 formed in the housing 79 at its opposite end.

To permit assembly of the chain and sprocket just described, which are entirely confined within the housing 96, the latter is preferably split along a vertical center line and is formed in two half sections, as illustrated in the drawings.

The shaft 118 carries a spiral gear 121 which meshes with a similar gear 122 carried on one end of the shaft 77, these gears 121 and 122 being confined within the housing 79.

It has been found that a speed of rotation of approximately 550 R. P. M. is satisfactory for the scraping disc when operating in connection with a wiping roller rotating at 120 R. P. M. This relatively high speed carries the full peripherial surface of the scraping device across the periphery of the wiping roller and removes all of the solder collected by the latter. A clean surface is, therefore, always presented to the seam of the can as it is engaged by the wiping roller.

After the solder has been collected on the scraping disc 91, it is removed by a pair of scraping blades 125 and 126. The blade 125 consists of a flat plate disposed at an acute angle to the face of the scraping disc and engaging this face adjacent the outer rim thereof. Blade 125 is secured to a bracket 127 carried by the housing 96.

Blade 126 (Figs. 2 and 4) is provided with an angular slot 128 which closely fits the tapered rim 92 of the disc 91 and permits engagement of the rim and the outer corner of the face of the disc, the blade being mounted at an angle on a bracket 129 carried on an arm 131 projecting outwardly from the housing 96. The blade 125 is used for removing the solder which has been scraped onto the face of the disc 91, while the blade 126 removes the solder from its periphery. It has been found that a scraper disc formed of hardened tool steel is satisfactory for this purpose inasmuch as the molten solder will not adhere to it.

From the foregoing it will be evident that the wiping device just described is adaptable to variations in the wiping operations on passing can bodies 31 or the like, the pivotal mounting of the frame 45 and parts carried thereby permitting accurate adjustment for positioning of the wiper roller 41 relative to the solder surface of the passing can body.

In a similar manner adjustment is made to insure proper coöperation between the scraping device and the solder wiping roller irrespective of the exact diameter of the latter. These various adjustments are made without interfering in any way with the proper rotation of the wiper roller and the scraping device, the adjustments being made while the entire mechanism is operating. By providing a satisfactory speed ratio between the rotations of these members, the maximum wiping efficiency is obtained in the device.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a soldering apparatus, the combination of a solder horn, solder applying devices located adjacent said horn for applying solder to can bodies passing therealong, a solder wiper located adjacent said horn for removing excess solder from said can bodies, and a rotary scraping device rotating adjacent to and across the face of said wiper with its periphery tangent thereto for removing the excess solder collected from said wiper, and means for rotating said scraping device.

2. In a soldering apparatus, the combination of a solder horn, solder applying devices located adjacent said horn for applying solder to can bodies passing therealong, a solder wiper located adjacent said horn for removing excess solder from said can bodies, said wiper comprising a roller rotating with a shaft, and a rotary scraping device rotating adjacent to and across the face of said wiper with its periphery tangent thereto, said device comprising a disc rotating with a shaft at right angles to the said wiper shaft for removing the excess solder collected from said wiper.

3. In a soldering apparatus, the combination of a solder horn, solder applying devices located adjacent said horn for applying solder to can bodies passing therealong, a solder wiping roller mounted on and rotating with a shaft for removing excess solder from said can bodies, a rotary scraping disc mounted on and rotating with a second shaft for engaging the periphery of said wiping roller, and means for rotating said wiper shaft at a low enough speed to prevent throwing solder from the wiper roller by centrifugal action and for rotating said scraper disc shaft at a sufficiently high speed to remove all of the collected solder from said wiper roller.

4. A solder wiping device for a soldering apparatus, comprising in combination, a solder horn for conveying soldered can bodies therealong, a solder wiping roller mounted on and rotating with a shaft and engaging said passing can bodies to remove excess solder therefrom, a frame in which said shaft is journalled, said frame having pivotal connection with a stationary part of the apparatus, means for adjustably pivoting said frame to position said wiping roller into solder wiping engagement with said can bodies, and a scraping device rotating adjacent to and across the face of said wiping roller with its periphery tangent thereto for removing the excess solder collected from said roller.

5. A solder wiping device for a soldering apparatus, comprising in combination, a solder horn for conveying soldered can bodies therealong, a solder wiping roller mounted on and rotating with a shaft and engaging said passing can bodies to remove excess solder therefrom, a frame in which said shaft is journalled, said frame having pivotal connection with a stationary part of the apparatus, means for adjustably pivoting said frame to position said wiping roller into solder wiping engagement with said can bodies, a scraping device rotating adjacent to and across the face of said wiping roller with its periphery tangent thereto for removing the excess solder collected from said roller, and adjusting means for maintaining the periphery of said scraping device in contact with the periphery of said wiping roller.

GEORGE FREDRICK WALTER.